US012567523B2

(12) United States Patent
Steiner et al.

(10) Patent No.: US 12,567,523 B2

(45) Date of Patent: Mar. 3, 2026

(54) INDUCTIVE COMPONENT FOR ELECTRIC OR HYBRID AIRCRAFT

(71) Applicant: Airbus SAS, Blagnac (FR)

(72) Inventors: Gerhard Steiner, Taufkirchen (DE); Florian Kapaun, Taufkirchen (DE); Ludovic Ybanez, Blagnac (FR); Ravi Kiran Surapaneni, Blagnac (FR); Gowtham Galla, Blagnac (FR)

(73) Assignee: Airbus SAS, Blagnac (FR)

( * ) Notice: Subject to any disclaimer, the term of this patent is extended or adjusted under 35 U.S.C. 154(b) by 450 days.

(21) Appl. No.: 18/341,222

(22) Filed: Jun. 26, 2023

(65) Prior Publication Data

US 2023/0420168 A1 Dec. 28, 2023

(30) Foreign Application Priority Data

Jun. 28, 2022 (EP) .................................... 22305940

(51) Int. Cl.

*H01F 6/06* (2006.01)
*H01F 5/06* (2006.01)
*H01F 41/04* (2006.01)

(52) U.S. Cl.

CPC ................ *H01F 6/06* (2013.01); *H01F 5/06* (2013.01); *H01F 41/048* (2013.01)

(58) Field of Classification Search

CPC . H01F 6/06; H01F 5/06; H01F 41/048; H01F 6/00; H01F 6/04; H01F 27/22; H01F 27/25; H01F 27/263; B64D 2041/005; B64D 47/00; H01B 12/06

See application file for complete search history.

(56) References Cited

U.S. PATENT DOCUMENTS

| | | | | |
|---|---|---|---|---|
| 10,861,626 B2 * | 12/2020 | Kim | H01F 6/06 | |
| 11,937,519 B1 * | 3/2024 | Bromberg | H01F 6/00 | |
| 2002/0149453 A1 * | 10/2002 | Snitchler | H01F 41/061 335/182 | |
| 2010/0179063 A1 | 7/2010 | Martchevskii | | |

FOREIGN PATENT DOCUMENTS

| | | | | |
|---|---|---|---|---|
| CN | 104111430 A * | 10/2014 | H01F 5/02 | |
| CN | 112912973 A * | 6/2021 | G21B 1/057 | |
| JP | S5828104 A | 2/1983 | | |
| JP | S63318014 A | 12/1988 | | |
| JP | H01161705 A | 6/1989 | | |
| WO | 0211215 A1 | 2/2002 | | |

OTHER PUBLICATIONS

European Search Report for corresponding French Patent Application No. 22305940 dated Dec. 9, 2022; priority document.

* cited by examiner

*Primary Examiner* — Mohamad A Musleh

(74) *Attorney, Agent, or Firm* — Greer, Burns & Crain, Ltd.

(57) ABSTRACT

An inductive component comprising an inductive element comprising a stack of an outer plurality of first strips of magnetic material, a central plurality of second strips of superconducting material, and an outer plurality of third strips of magnetic material, the inductive element being flexible and configured to form at least one loop of said stack of first strips, second strips and third strips, wound on itself. Also an inductive device and an aircraft with such an inductive component or device.

9 Claims, 5 Drawing Sheets

INDUCTIVE COMPONENT FOR ELECTRIC OR HYBRID AIRCRAFT

CROSS-REFERENCES TO RELATED APPLICATIONS

This application claims the benefit of European Patent Application No. 22 305 940-3 filed on Jun. 28, 2022, the entire disclosure of which is incorporated herein by way of reference.

FIELD OF THE INVENTION

The present invention relates to electronic components. The invention relates more particularly to power electronic components and in particular those used in on board systems of an aircraft. At least one embodiment relates to an improved inductive element usable in an aircraft.

BACKGROUND OF THE INVENTION

Liquid hydrogen is a cryogenic fluid that can be used as an energy source for electricity generation. Thus, for example, it is possible to use a hydrogen fuel cell to power all the flight control and communication systems of an aircraft, as well as the on-board lighting and the power supply of various accessory devices used in the aircraft. Liquid hydrogen can also be used as an energy source for the propulsion of an aircraft, by powering a fuel cell or by direct combustion, which has the advantage of only releasing water into the atmosphere. The use of hydrogen requires distribution systems between one or more production or storage tanks and consuming devices. Thus, pipes are conventionally used to convey liquid hydrogen between a storage tank and a liquid hydrogen consuming device such as, for example, a hydrogen fuel cell.

It is known that there is a need to massively reduce the production of carbon emissions, to safeguard the environment, and electric or hybrid propulsion is showing promise for this. But the conventional systems on board of an aircraft are such that the weight/electrical power ratio is not satisfactory as they are and there is therefore a need to obtain electrical systems making it possible to provide power in relation to their weight to satisfy all the constraints.

It is therefore necessary to optimize the weight/electrical power ratio of all the elements of an aircraft propulsion system, and in particular the power components through which strong currents pass.

The situation can be improved.

An inductor is a passive electrical component used in power converters, and which improves the power quality by filtering high frequency currents.

A typical inductor consists of a current carrying conductor wound into several turns on a core to form an inductor.

In a conventional magnetic component to achieve the high inductance required in the systems, two design methods are adopted.

Windings are made on a heavy high permeability core which has higher inductance per turn, thus few turns of windings are required and the components realized are compact but heavy.

The other method is to build an air core solenoid where the inductance per turn is lower and requires many turns to realize the required inductance, but these components are bulky. In addition as there is no closed path for the magnetic field in these solenoids which causes higher radiated emissions, thus requiring heavy shielding.

FIG. 1 to FIG. 4 represent examples of inductors in a power converter.

FIG. 1 represents a Direct Current (DC) inductor in a power converter. In FIG. 1, the power converter comprises a DC inductor 10 comprising a coil 12 and a core 14, and transistors 16, such as MOSFET (Metal-Oxide Semiconductor Field-Effect Transistor) or IGFET (Insulated-Gate Field-Effect Transistor), and a resistor 18.

FIG. 2 represents an interleaved inductor 20, also referred to as an Alternative Current (AC) filter.

FIG. 3 represents an EMI (ElectroMagnetic Interference) filter 22 with two coils 12 and one core 14, arranged between a source 24 and a power converter 26. FIG. 4 represents a transformer 28 with primary and secondary coils 12.

SUMMARY OF THE INVENTION

The present invention replaces all these components with a novel superconducting magnetic component.

The aim of the invention is to obtain an increased ratio between the weight of an aircraft and the electrical power available on board for the aircraft systems for the purpose of reducing the energy required to perform an aircraft flight. An object of the invention is to use lighter inductive components that can be configured for use on board an electrically or at least partially electrically propelled aircraft.

To this end, it is proposed an inductive component comprising an inductive element comprising a stack of an outer plurality of first strips of magnetic material, a central plurality of second strips of superconducting material, and an outer plurality of third strips of magnetic material, the inductive element being flexible and configured to form at least one loop of said stack of first strips, second strips and third strips, wound (rolled-up) on itself.

Said stack successively comprises a plurality of first strips of magnetic material, a plurality of second strips of superconducting material, and a plurality of third strips of magnetic material.

According to an embodiment, each first and third strip of magnetic material is surrounded by an electrically insulating and thermally conductive layer.

According to an embodiment, the inductive component comprises a magnetic element; and the inductive element is wound on the magnetic element.

Another object of the invention is an inductive device comprising an inductive component as previously described, arranged in a cryogenic fluid volume.

Another object of the invention is an inductive device comprising an inductive component as previously described, held in contact with a cold source comprising a cryogenic fluid.

Advantageously, the inductive device is configured to operate a connection between a power converter device and a powertrain.

The invention also relates to an aircraft comprising an inductive component as previously described, or an inductive device as previously described.

BRIEF DESCRIPTION OF THE DRAWINGS

The characteristics of the invention mentioned above, as well as others, will appear more clearly on reading the following description of at least one embodiment, said description being made in relation to the attached drawings, among which.

DETAILED DESCRIPTION OF THE PREFERRED EMBODIMENTS

Figure 1:
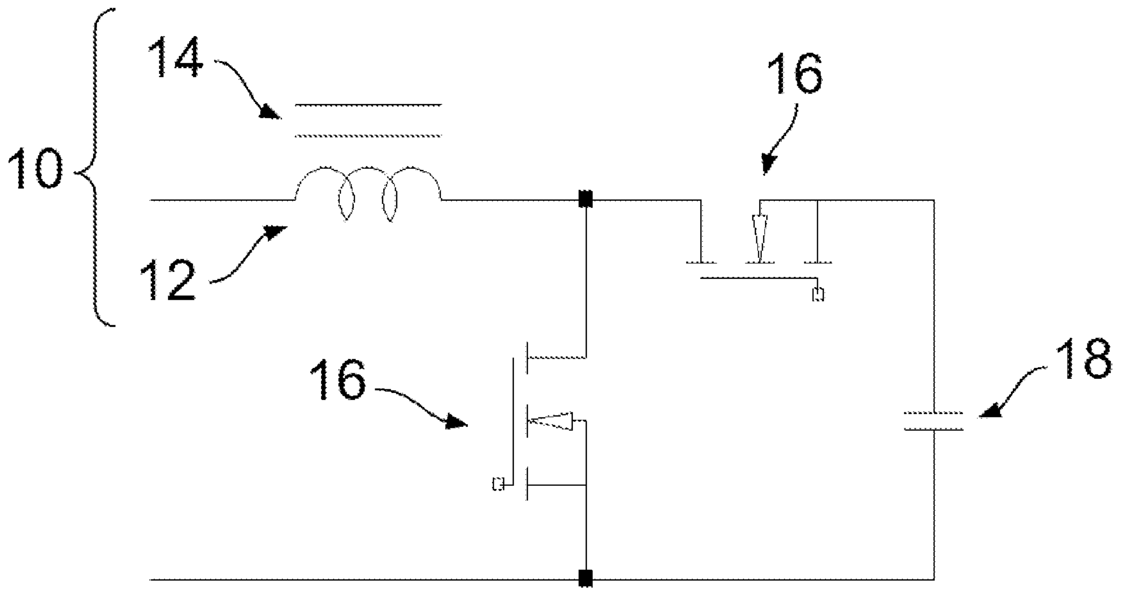
Fig. 1 (Prior Art)
FIG. 1 schematically illustrates a prior art inductor.
Figure 2:
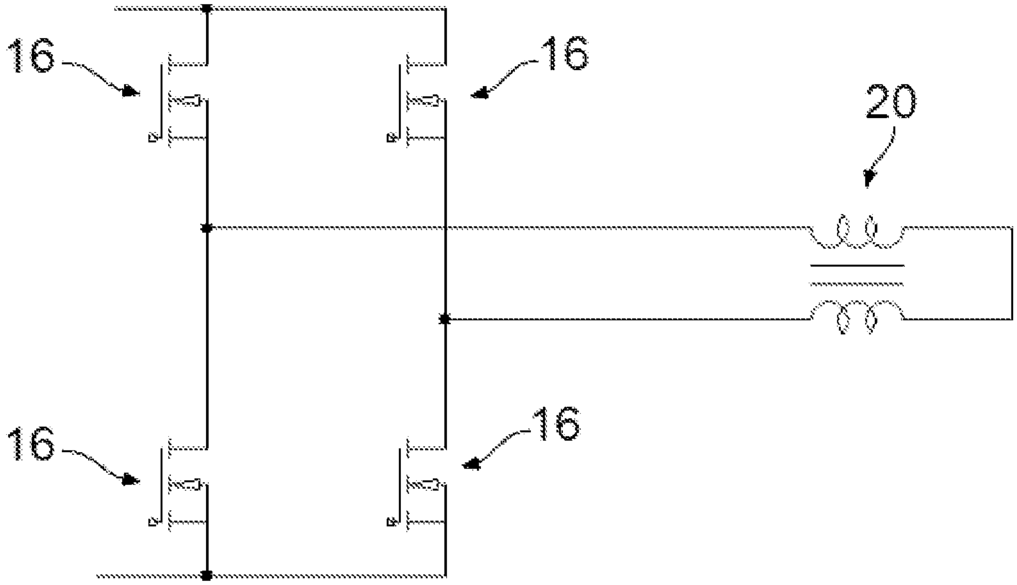
Fig. 2 (Prior Art)
FIG. 2 schematically illustrates another prior art inductor.
Figure 3:
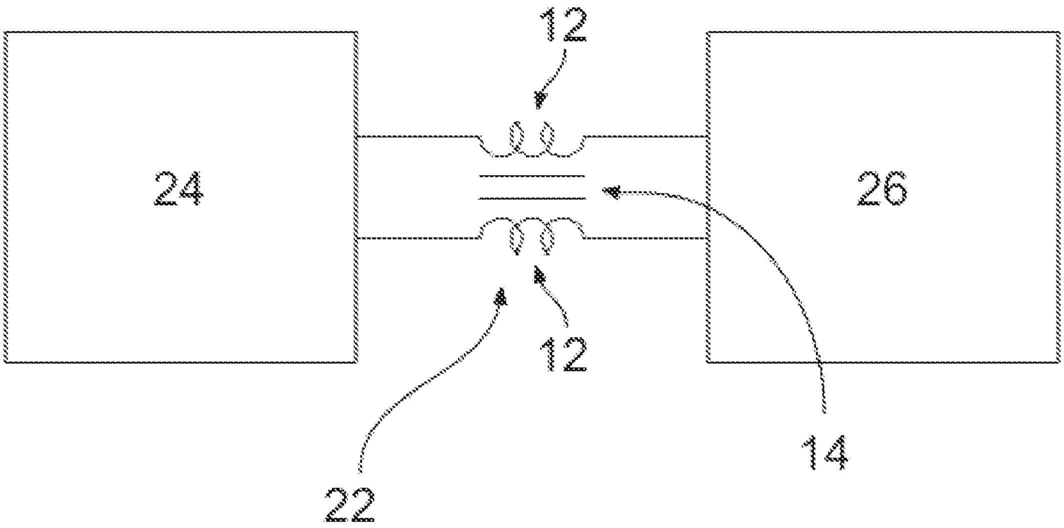
Fig. 3 (Prior Art)
FIG. 3 schematically illustrates a further prior art inductor.
Figure 4:
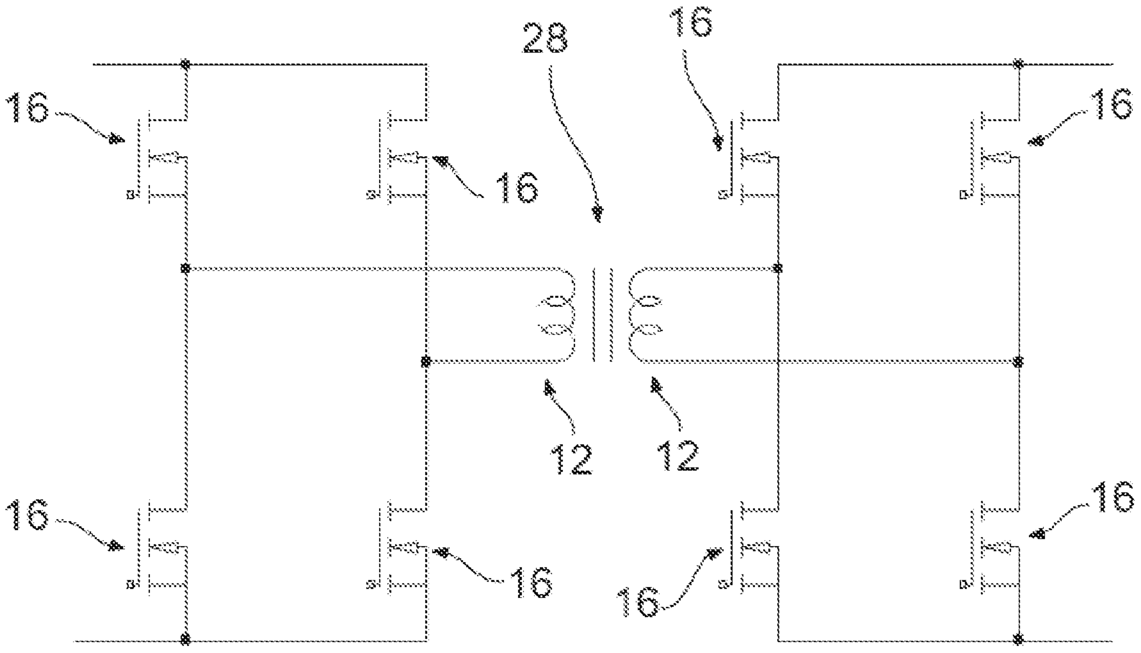
Fig. 4 (Prior Art)
FIG. 4 schematically illustrates an additional prior art inductor.
Figure 5:
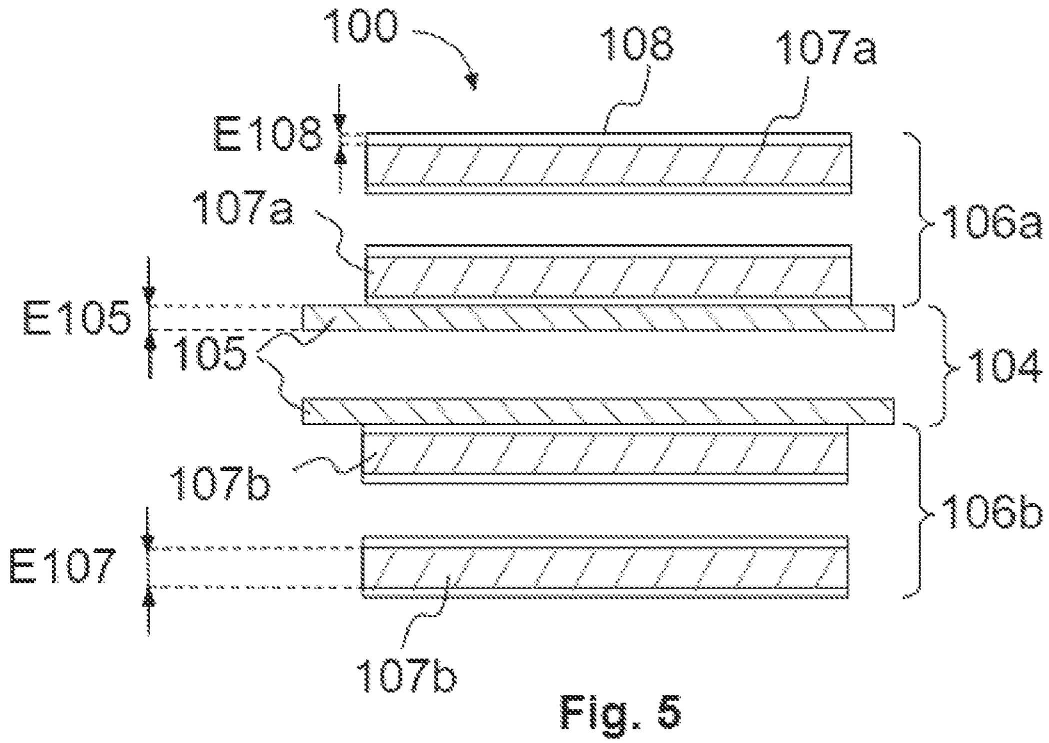
FIG. 5 schematically illustrates an inductive element according to an embodiment of the invention.

FIG. 5 schematically illustrates a superconducting inductive element 100 comprising a strip assembly taking the form of a stack of material strips (also called tapes).

According to a first embodiment, the inductive element 100 comprises at least one central strip 105 made of a superconducting material, sandwiched between at least one strip 107*a* made of a magnetic material, on the one hand, and at least one strip 107*b* made of a magnetic material, on the other hand. No gap is present between the central strip 105 made of a superconducting material and each of the strip 107*a*, 107*b* made of a magnetic material surrounding the central strip 105 made of a superconducting material.

The superconducting material may be High Temperature Superconducting (HTS) material, such as Bismuth Strontium Calcium Copper Oxide (BSCCO), Yttrium Barium Copper Oxide (YBCO), Rare-Earth Barium Copper Oxide (REBCO) or magnesium diboride ($MgB_2$), or Low Temperature Superconducting (LTS) material, such as niobium-tin ($Nb_3Sn$) or niobium-titanium (NbTi).

The magnetic material of the strips 107*a*, 107*b* may be soft magnetic material, such as nanocrystalline magnetic material, amorphous magnetic material or ferrites.

The thickness E105 of a strip 105 made of a superconducting material is preferably comprised between 1 μm and 5 mm.

The thickness E107 of a strip 107*a*, 107*b* made of a magnetic material is comprised between 1 μm and 5 mm.

The width of the strips 105 made of a superconducting material and of the strips 107*a*, 107*b* made of a magnetic material depends on the required inductance of the inductive element 100. According to one embodiment, the inductive element 100 comprises a central plurality 104 of strips 105 made of a superconducting material, sandwiched between an outer plurality 106*a* of strips 107*a* made of a magnetic material, on the one hand, and an outer plurality 106*b* of strips 107*b* made of a magnetic material, on the other hand. No gap is present between each of the strips 105 made of a superconducting material. No gap is present between each of the strips 107*a* made of a magnetic material. No gap is present between each of the strips 107*b* made of a magnetic material.

The plurality 104 of strips 105 made of a superconducting material comprises at least two strips. The number of strips 105 depends on the maximum current for which the inductive element 100 is designed for, and the temperature to which the inductive element 100 is working.

The outer plurality 106*a* of strips 107*a* made of a magnetic material may comprise the same or a different number of strips than the outer plurality 106*b* of strips 107*b* made of a magnetic material. The plurality 104 of strips 105 made of a superconducting material may comprise the same or a different number of strips than the plurality 106*a*, 106*b* of strips 107*a*, 107*b* made of a magnetic material.

According to one embodiment, the magnetic material forming the outer plurality 106*a* of strips 107*a* is the same as the magnetic material forming the outer plurality 106*b* of strips 107*b*. According to an alternative embodiment, these two magnetic materials are different.

According to an embodiment, the different strips are assembled together by gluing.

Each strip 107*a*, 107*b* made of a magnetic material is surrounded by an electrically insulating and thermally conductive layer 108. The electrically insulating and thermally conductive layer 108 may be a thin polyamide layer, or an epoxy layer, or realized on an epoxy powder coating, or a ceramic layer, or realized on a ceramic powder coating. The thickness E108 of an electrically insulating and thermally conductive layer 108 depends on the voltage withstand capacity of the inductive element 100. Advantageously, the magnetic strips which surround the superconductive strip form a closed path for the magnetic field which works as a shield for a radiated emission.

According to an embodiment, the inductive element 100 can be arranged in a cryogenic fluid (such as liquid hydrogen, for example) volume or held in contact with a cold source comprising a cryogenic fluid, in order to obtain a superconducting state. In addition, when liquid hydrogen is available in an aircraft, such an inductive element can be used onboard, cooled without requiring an additional cooling liquid, which further reduce the cooling complexity of the assembly.

Figure 6:
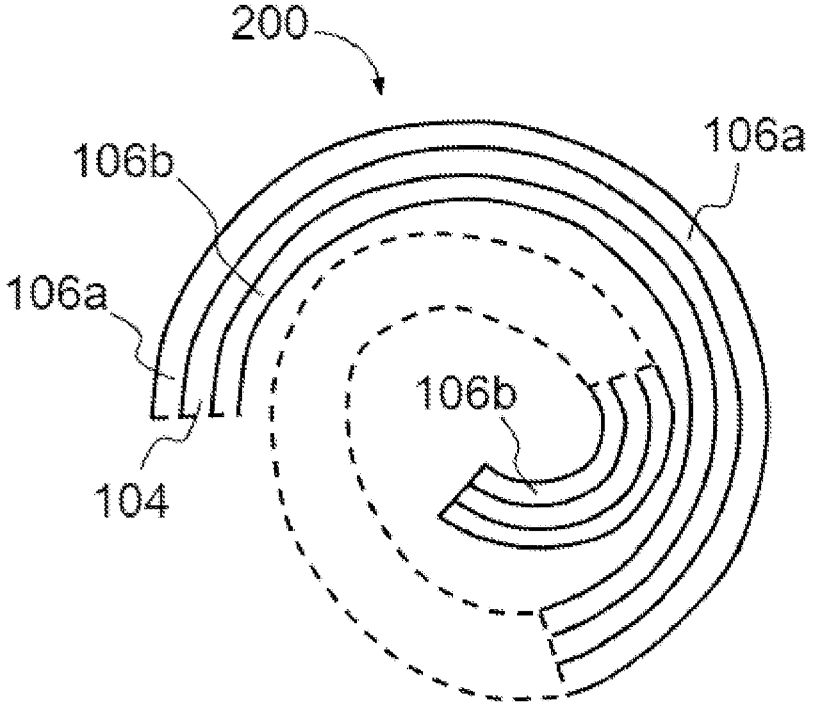
FIG. 6 schematically illustrates the inductive element already illustrated on FIG. 5 wound on itself to form an inductive solenoid.

FIG. 6 illustrates an inductive component 200 (an electrical or electronical coil) made from the inductive element 100, which is flexible and wound (rolled-up) on itself, so as to form one or more loops. The length of the inductive element 100 is sufficient to allow to form at least one loop. The length of the inductive element 100 depends on the required inductance of the inductive element 100 and on the current carry capacity of the inductive elements, and on the temperature to which the inductive element operates. Advantageously, such an arrangement of the inductive component 200, made from the inductive element 100, offers a high inductance per unit of weight and length. The inductive element 100 may be wound on itself so as to be in the form of a spiral, or so as to be in the form of a square spiral, or so as to be in the form of an oval spiral.

Figure 7:
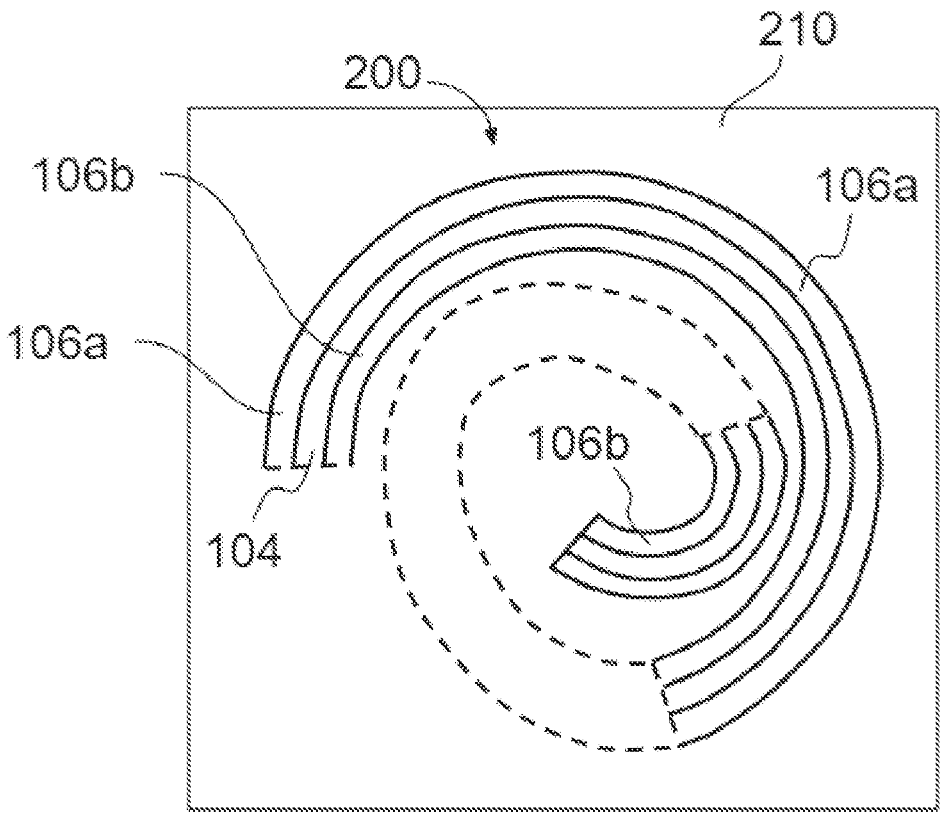
FIG. 7 schematically illustrates the inductive element already illustrated on FIG. 5 wound on a magnetic element; and, FIG. 8 schematically illustrates an aircraft comprising at least an inductive element as illustrated on FIG. 5 or at least a solenoid as illustrated on FIG. 6.

FIG. 7 illustrates an inductive component 200 made from the inductive element 100, which is flexible and wound (rolled-up) on itself, so as to form one or more loops, and made from a magnetic element 210, on which the inductive element 100 is wound on. Such inductive component 200 has a higher inductance per unit of weight and length than the inductive component 200 represented on FIG. 6. The magnetic element 210 may be made of soft magnetic material, such as nanocrystalline magnetic material, amorphous magnetic material or ferrites.

Figure 8:
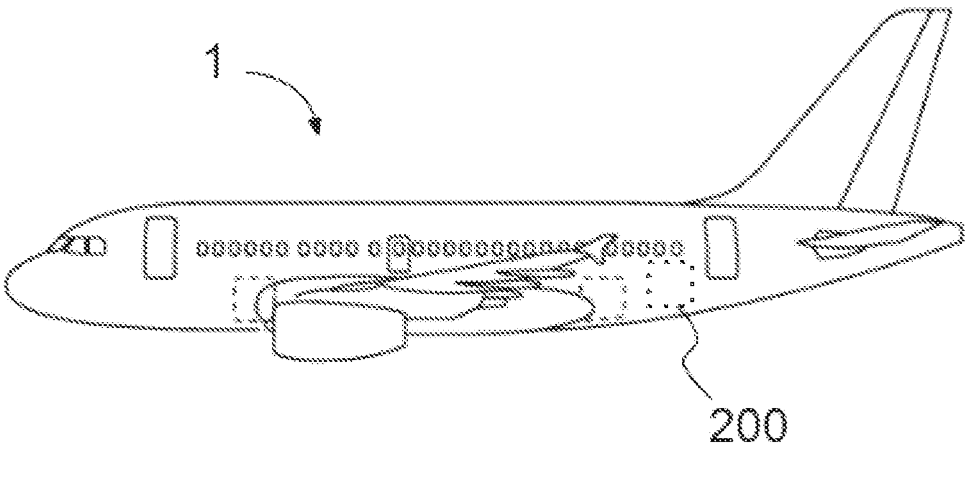

FIG. 8 illustrates an aircraft 1 which comprises at least one inductive element 100 and/or at least one inductive component 200. Such elements represent a clear advantage for use on board an aircraft, a context in which it is advisable to improve the ratio of weight to available power for the purpose of reducing energy consumption. According to an embodiment, the aircraft 1 is propelled by an electric power unit.

Advantageously, solenoids comprising inductive elements such as the inductive element 100 can be used in power conversion equipment or systems of an or to transport energy between a power conversion device and an aircraft's electric drive unit to avoid the use of heavy and/or bulky components such as in prior art.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An inductive component comprising:

an inductive element comprising a stack of an outer plurality of first strips of magnetic material, a central plurality of second strips of superconducting material, and an outer plurality of third strips of magnetic material, the inductive element being flexible and configured to form at least one loop of said stack of first strips, second strips, and third strips, wound on itself.

2. The inductive component according to claim 1, wherein each first and third strip of magnetic material is surrounded by an electrically insulating and thermally conductive layer.

3. The inductive component according to claim 1, comprising a magnetic element, the inductive element being wound on said magnetic element.

4. An inductive device comprising:

the inductive component according to claim 1 arranged in a cryogenic fluid volume.

5. The inductive device according to claim 4, wherein the inductive device is configured to operate a connection between a power converter device and a powertrain.

6. An inductive device comprising:

the inductive component according to claim 1 held in contact with a cold source comprising a cryogenic fluid.

7. The inductive device according to claim 6, wherein the inductive device is configured to operate a connection between a power converter device and a powertrain.

8. An aircraft comprising the inductive component according to claim 1.

9. An aircraft comprising the inductive device according to claim 4.

* * * * *